United States Patent

[11] 3,566,025

[72] Inventor Marcel Rognon
Houilles-Val D'Oise, France
[21] Appl. No. 702,301
[22] Filed Feb. 1, 1968
[45] Patented Feb. 23, 1971
[73] Assignee U.S. Philips Corporation
New York, N.Y.
[32] Priority Feb. 2, 1967
[33] France
[31] 93443

[54] DEVICE FOR THE AUTOMATIC GAIN CONTROL AND CLAMPING OF THE BLACK LEVEL FOR TELEVISION RECEIVERS
8 Claims, 10 Drawing Figs.

[52] U.S. Cl. .......... 178/7.3
[51] Int. Cl. .......... H04n 5/56
[50] Field of Search .......... 178/7.3 (DC), 7.5 (DC), 7.3 (S), 7.5 (S); 330/11

[56] References Cited
UNITED STATES PATENTS
3,288,926 11/1966 Thompson .......... 178/7.3DC
3,305,637 2/1967 Loughlin et al. .......... 178/7.5DC

*Primary Examiner*—Richard Murray
*Assistant Examiner*—George G. Stellar
*Attorney*—Frank R. Trifari

ABSTRACT: In a circuit for generating an automatic gain control voltage and for clamping the black level of television signals, a diode has one electrode connected to a video input circuit. Line flyback pulses are applied to the other electrode of the diode by way of a resistor, and an automatic gain control voltage is derived from the other electrode of the diode. A blocking circuit is provided to prevent conduction of the diode during the line synchronizing signal. A video output circuit capacitively coupled to the input circuit is clamped by a line flyback pulses which are also blocked during the line synchronizing period.

Figure 1:
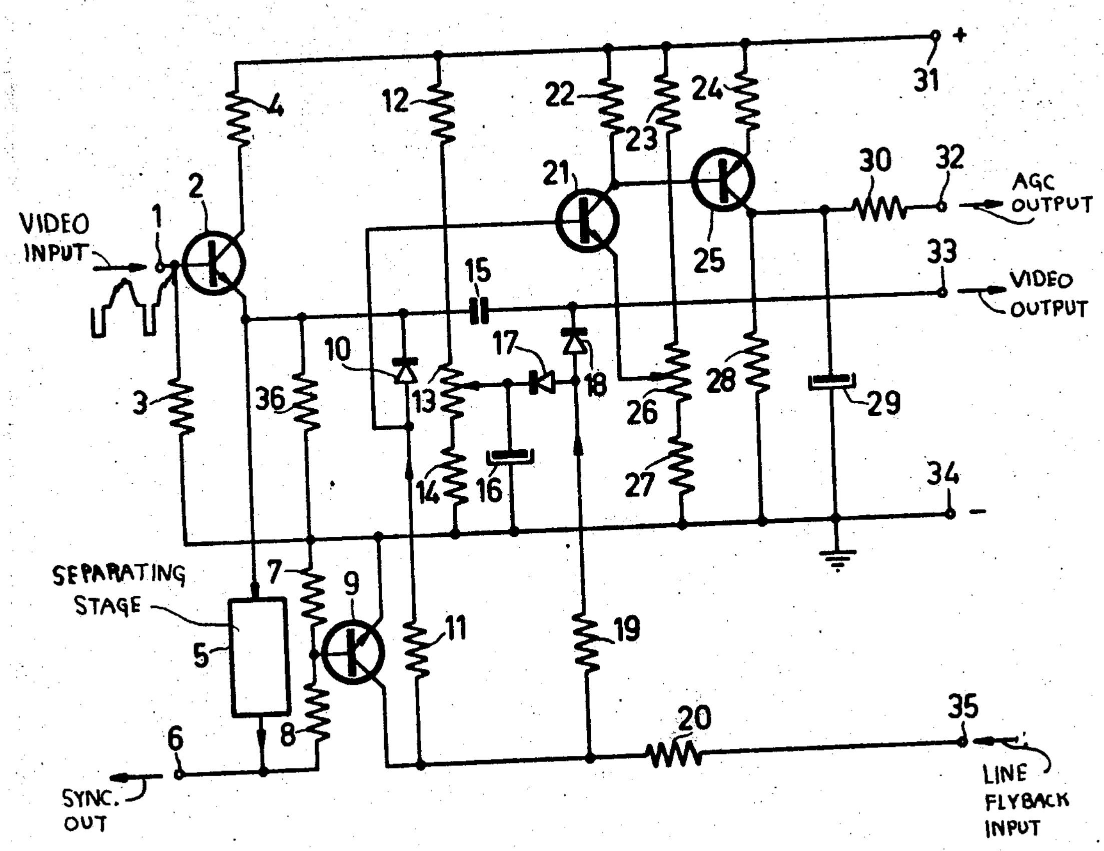

INVENTOR.
MARCEL ROGNON

BY
Frank R. Jeifari
AGENT

INVENTOR.
MARCEL ROGNON
BY
Frank R. Trifari
AGENT

INVENTOR.
MARCEL ROGNON

BY Frank R. Trifari
AGENT

INVENTOR.
MARCEL ROGNON
BY
AGENT

INVENTOR.
MARCEL ROGNON

BY Frank R. Trifari
AGENT

INVENTOR.
MARCEL ROGNON

BY

AGENT

DEVICE FOR THE AUTOMATIC GAIN CONTROL AND CLAMPING OF THE BLACK LEVEL FOR TELEVISION RECEIVERS

"Method or and device for the automatic gain control and clamping of the black level for television receivers."

The invention relates to a television receiver having a gated automatic gain control circuit. The circuit features gate circuit having a first input to which a brightness signal obtained from a received television signal can be applied, and a second input which is connected to an output of a line output generator to the second input a periodic gating pulse is applied, which is derived from the line timebase generator. From the gate output a pulse gated from the brightness signal, having an amplitude determined by the amplitude of the brightness signal supplied to the first input at the time of the occurrence of the gating pulse supplied to the second input, is derived. From the pulse gated from the brightness signal the automatic gain control signal is derived.

It is known that the nature of the modulation of television signals differs strongly from that of radio signals. As a result of this difference the simple signal detection as is normal in the automatic gain control devices of radio receivers cannot be used in television receivers.

The differences are mainly due to the fact that, in amplitude modulation which is conventionally used for radio signals, the signal which is modulated in amplitude on the carrier wave contains no DC information. The modulation of the carrier wave consequently is such that the average value of the amplitude of the said carrier wave does not vary. In such modulation the voltage component which appears after detection and on which the AC component corresponding to the low frequency modulation is superimposed is a correct measure of the level of the undetected carrier wave.

The video signal modulated in amplitude on a carrier wave and supplying to a television receiver the information which is required for its operation, has a reference level, termed "black level," which results in a level of the carrier wave which corresponds to a fixed percentage of a maximum carrier wave amplitude.

As a result of this the DC component which appears after the video detection has a value which depends not only upon the level of the received signal and the amplification before detection, but also upon the instantaneous contents of the picture. The result is that the use of said direct voltage for the operation of a device for automatic gain control of a television receiver constitutes a rather coarse approach which does not give full satisfaction.

Automatic gain control devices are known which are controlled by the level of the signal which is detected at the instant of the said back porch, so at the black level. In these devices a gating signal for "sampling" said level is directly derived from the line synchronization signal.

Such devices which, in principle operate excellently have the serious drawback that the automatic gain control voltage fails in the case of any suppression of the synchronization signals either during the emission or, for example, in operating the channel selector. This is the result of the inertia of the circuit. As a result of this, irreversible cutoff phenomena occur in various stages of the television receiver, which make it necessary to provide so-called "release" devices together with the actual automatic gain control circuit, which devices are complicated and expensive.

The invention mitigates these drawbacks and according to the invention a television receiver of the type mentioned in the preamble is therefore characterized in that a blocking device which can be operated by a periodic cutoff signal derived from the brightness signal is included in the connection between the output of the line timebase generator with the second input, as a result of which the occurrence of a gating pulse at the second input is avoided during the occurrence of the synchronization signal in the brightness signal.

With the automatic gain control device in a television receiver according to the invention and also with a clamping of the black level according to a further embodiment of the invention, an automatic gain control voltage and a good clamping of the black level, respectively, can be obtained without interruption irrespective of the nature of the signal applied to the aerial of the receiver. Any blocking of the receiver as a result of a possible failure of the synchronization signals is prevented, as a result of which the necessity of release circuits is avoided.

In order that the invention may be readily carried into effect, it will now be described in greater detail, by way of example, with reference to the accompanying drawings, in which:

FIG. 1 shows the principle circuit diagram of a device for automatic gain control and for clamping the black level of a television receiver according to the invention.

Figure 2A:
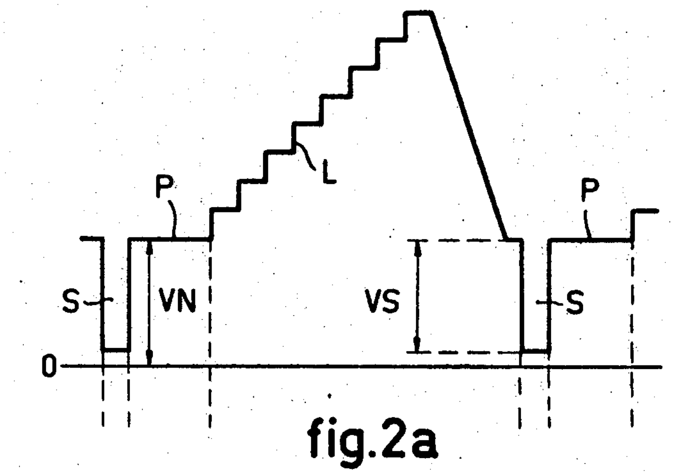
Figure 2B:
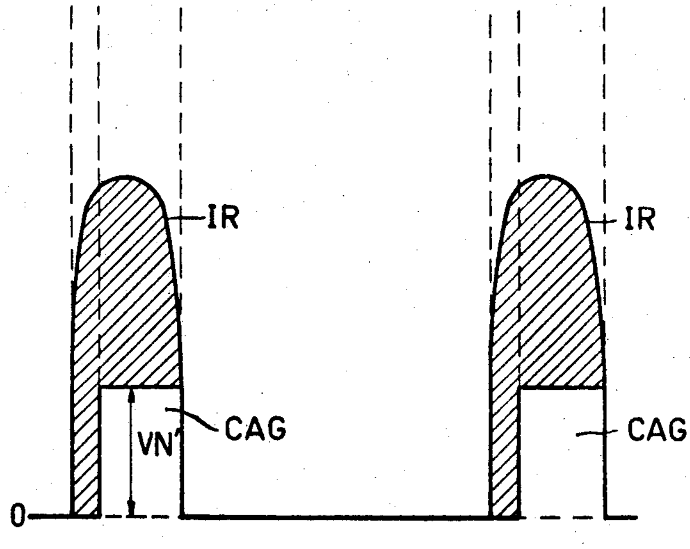

FIGS. 2*a* and 2*b* show a video signal and the gating pulses, respectively, to obtain the automatic gain control voltage.

Figures 3A, 3B:
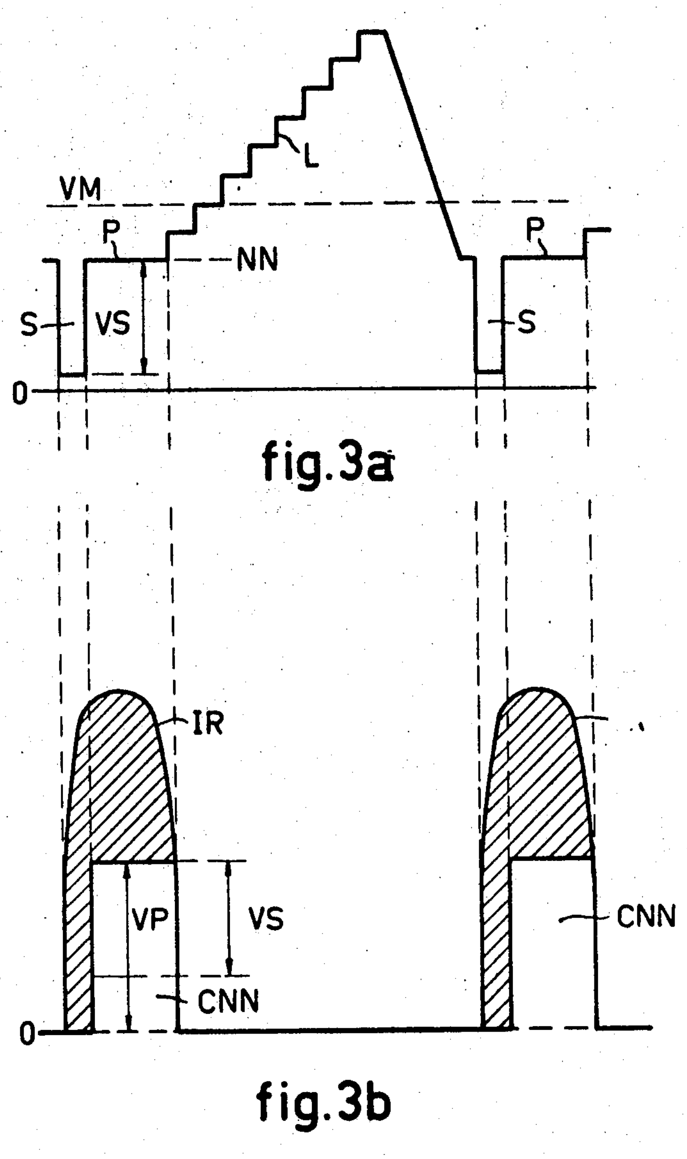

FIGS. 3*a* and 3*b* show a video signal and the gating pulses, respectively, for clamping the black level.

Figure 4:
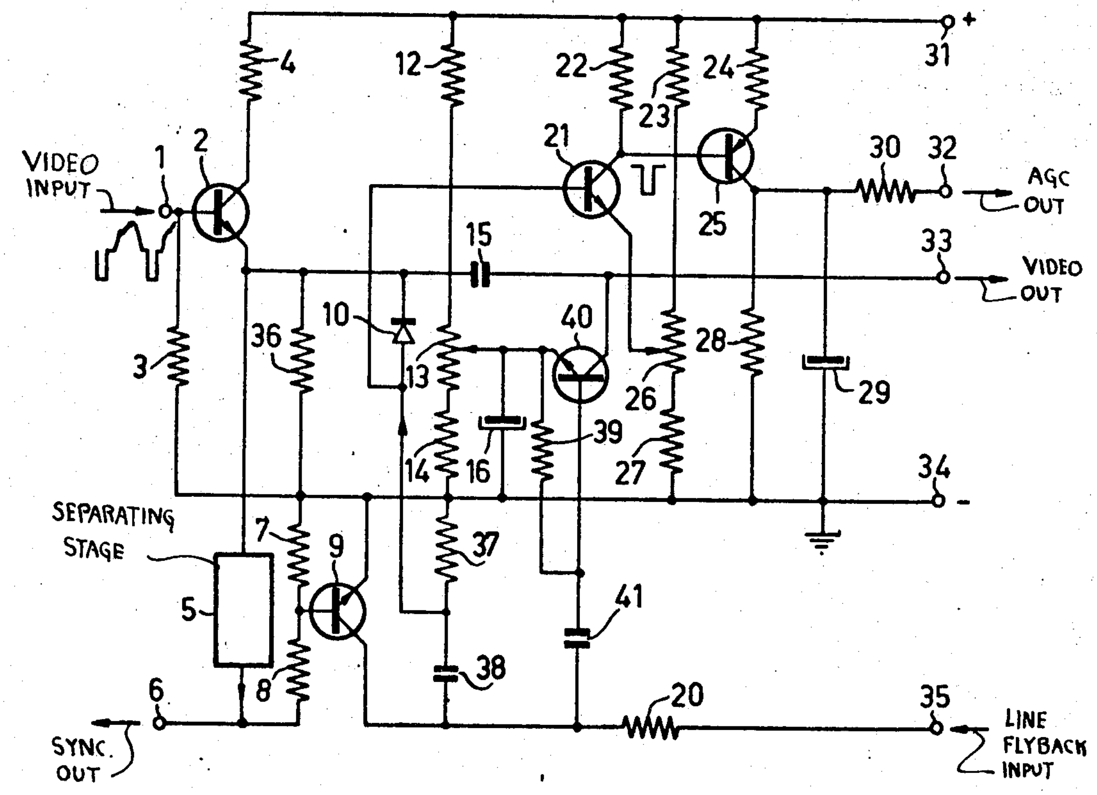

FIG. 4 shows a variation of an automatic gain control and clamping device for a television receiver, more particularly destined for a television receiver comprising a synchronization system with phase comparison.

FIGS. 5*a* and 5*b* and 6*a* and 6*b* show the shape of the signals corresponding to the device shown in FIG. 4.

In the device for automatic gain control and clamping of the black level for a television receiver shown in FIG. 1, an input terminal 1 for a signal obtained in the receiver by detection is connected to the base of a transistor 2 of the NPN type, a resistor 3 being connected between the said base and earth. The collector of the transistor 2 is connected, through a resistor 4, to a positive terminal 31 of a voltage source, the emitter of the said transistor being connected to earth through a resistor 36.

Furthermore, more, the emitter of the transistor 2 is connected at one end to the input terminal of a separating stage 5 (shown diagrammatically) of the said receiver and at the other end to the cathode of a diode 10. An output of the separating stage 5 is connected at one end to a terminal 6 and at the other end to earth through a potentiometer having two resistors 7 and 8, the common point of the said resistors being connected to the base of the transistor 9 of the NPN-type, the emitter of which is connected to earth.

The anode of the diode 10 which forms part of a gate circuit is connected to the collector of the transistor 9 through a resistor 11, while the said collector is connected at one end, through a resistor 20, to a terminal 35 at which the line flyback pulses appear. The transistor 9 with the resistor 20 constitutes a blocking device.

A potentiometer, constituted by two resistors 12 and 14 and a potentiometer 13, is connected between the positive terminal 31 and earth, the sliding contact of the potentiometer 13 being connected to the cathode of a diode 17 and to a connection of a decoupling capacitor 16 which is connected to earth with its other connection.

The cathode of a diode 18 is connected at one end, through a capacitor 15, to the emitter of the transistor 2, and at the other end to a terminal 33 which constitutes the input of a video output stage. The anodes of the diodes 17 and 18 are connected together and to the collector of the transistor 9 through a resistor 19.

The common point of the diode 10 and the resistor 11 is connected to the base of a transistor 21 of the NPN-type, the collector of which is connected to the positive terminal 31, through a resistor 22, and the emitter of which is connected to the sliding contact of a potentiometer 26 which, together with two resistors 23 and 27, forms part of a potentiometer tapped between the terminal 31 and earth.

A transistor 25 of the PNP-type, the emitter of which is connected to the said terminal 31 through a resistor 24, has its base connected to the collector of the transistor 21, while its collector, which is decoupled by a capacitor 29, is connected at one end, through a resistor 28, to earth and at the other end, through a resistor 30, to a terminal 32, the said terminal constituting the output for the automatic gain control voltage.

The operation of the circuit shown in FIG. 1, is as follows:

The transistor 2, in emitter-follower arrangement, receives at its base the video signals originating from a first amplifier stage (not shown) as a result of which a signal as shown in FIg. 2*a* appears at the emitter. This FIG. 2*a* shows such a signal partly and diagrammatically the part L of which corresponds to the variable brightness signal and the part S of which corresponds to a line synchronization pulse with constant amplitude VS, the back porch P having a potential VN relative to earth. The cutoff voltage of the transistor 2 lies somewhat below the level of the lower side of the synchronization pulses S shown in FIG. 2*a*. At this instant, the emitter potential is very near to that of earth. The emitter potential again increases to the level VN during the duration of the back porch. The difference VN–VS corresponds to an emitter voltage at which the transistor 2 is just not cutoff so that the level of the lower side of the synchronization pulses causes a small current to flow in the transistor 2 as a result of which limiting of these pulses is avoided.

FIG. 2*b* shows line flyback pulses IR the duration of which is equal to the sum of those of a synchronization pulse S and of a back porch P and which begins simultaneously with each pulse S. The pulses IR serve to generate voltage pulses CAG for automatic gain control and, according to the invention, are cutoff during the occurrence of the synchronization pulse S. The amplitude thereof is approximately equal to the level VN of the back porch relative to earth.

Such a positive flyback pulse IR which may be derived from the output transformer of the line output (terminal 35) is applied to the anode of the diode 10 through the resistor 11. Since the value of this resistor is very much larger than that of the output impedance of the emitter-follower stage 2, the potential of the cathode of the diode 10 cannot exceed that of the emitter at the instant considered: so limiting occurs. In order to prevent that there is measured on the lower side of the synchronization pulses, the transistor 9 which forms part of a blocking device is saturated during the duration of the synchronization pulses S by a blocking signal from the separating stage 5. The collector of the transistor 9 then assumes substantially earth potential so that the line flyback pulses are cutoff during the duration of the synchronization signals. The pulses which occur at the anode of the diode 10 have an amplitude VN' which, at any instant, is equal to VN increased by the direct voltage drop in the diode and consequently are a measure of any variations of VS.

If the signal received by the aerial of the receiver differs from that of a normal television signal, for example, is equal to a nonmodulated carrier wave, an average direct voltage the constant level of which will be sampled by the flyback pulses will appear upon detection thereof at the emitter of the transistor 2. In the absence of synchronization pulses the line output remains operating at its natural frequency.

It is obvious that, irrespective of the nature of the signal at the emitter of the transistor 2, a voltage at the anode 10 is always obtained.

The pulses derived from the anode of the diode 10 and gated from the signal obtained from the emitter of the transistor 2 are amplified by the transistors 21 and 25 of the NPN and PNP-type, respectively. The emitter potential of the transistor 21 which is adjustable by means of the potentiometer 26 restricts the threshold of the automatic gain control voltage, the latter becoming available, through the resistor 30, at the terminal 32 after smoothing by the capacitor 29.

Since the capacitor 15 transmits only the AC component of the video signal originating from the emitter of the transistor 2 to the terminal 33 which constitutes the input of the video output amplifier, the average value of this signal could vary dependent upon the picture contents (level VM of FIG. 3*a*) and the black level NN of the porches P could also show these variation. FIG. 3*a* shows the same video signal as FIG. 2*a* as it appears at the cathode of the diode 18, the broken line VM representing the average voltage of the said signal at that instant. In order to clamp the black level at a chosen level, the flyback pulses IR are applied to the interconnected anodes of the diodes 17 and 18. In this manner the pulses applied through the resistor 19 are cut off at a value VP determined by the position of the potentiometer 13, as shown in FIG. 3*b*, in which, like in FIG. 2, the line flyback pulses IR are limited in duration and in amplitude. The pulses CNN are black level clamping pulses. This value VP again appears at the cathode of the diode 18. The terminal 33 must have a rather large impedance to ground.

In the same manner as for the gating pulses for the automatic gain control, the transistor 9 ensures that the flyback pulse applied to the diode 18 occurs only during the back porch. Through the diode 18 the capacitor 15 is charged in each line time during the duration of the back porch up to the potential which is determined by the potentiometer 13. Due to the high impedance of the terminal 33 this potential remains substantially constant during the duration of the said porch so that consequently a clamping of the black level is reached. The potentiometer 13 thus serves for brightness control.

When the television receiver comprises a synchronization system with phase comparison the above device may show certain drawbacks. Due to the fact namely that between the synchronization pulse and the line flyback pulse a phase angle may exist, for example, the trailing edge of the latter may occur during the brightness signal at the beginning of the line stroke, and thus disturb the measurement of the constant part of the video signal in the line flyback.

This drawback may be avoided in the device shown in FIG. 4 in that the line flyback pulses IR are differentiated by a capacitor 38 and a resistor 37 or by a differentiating network 39, 41 connected between the terminal 35 and the diode 120 or the transistor 40, respectively. The width of the peak of the gating pulses is therefore reduced (see FIG. 5) and the danger no longer exist of overlapping of the gating pulse and the brightness signal when the gating pulse is shifted to the right.

In FIG. 4 the components corresponding to those of FIG. 1 are denoted by the same reference numerals. The diagram shown in FIG. 4 differs from that shown in FIG. 1 in the operation of the gate diode 10 through the differentiating network 38, 37 the replacement of the diodes 17 and 18 by a transistor 40, and the use of the differentiating network 39, 41. The anode of the diode 10 is connected to the common point of the resistor 37 and the capacitor 38. The other end of the resistor 37 is connected to earth and the other end of the capacitor 38 is connected to the collector of the transistor 9.

The emitter of the transistor 40 of the NPN-type is connected to the sliding contact of the potentiometer 13, the collector is connected to the terminal 33, and the base is connected to the collector of the transistor 9 through the capacitor 41. In addition, the resistor 39 is connected between the emitter and the base of the transistor 40.

Figures 5A, 5B:
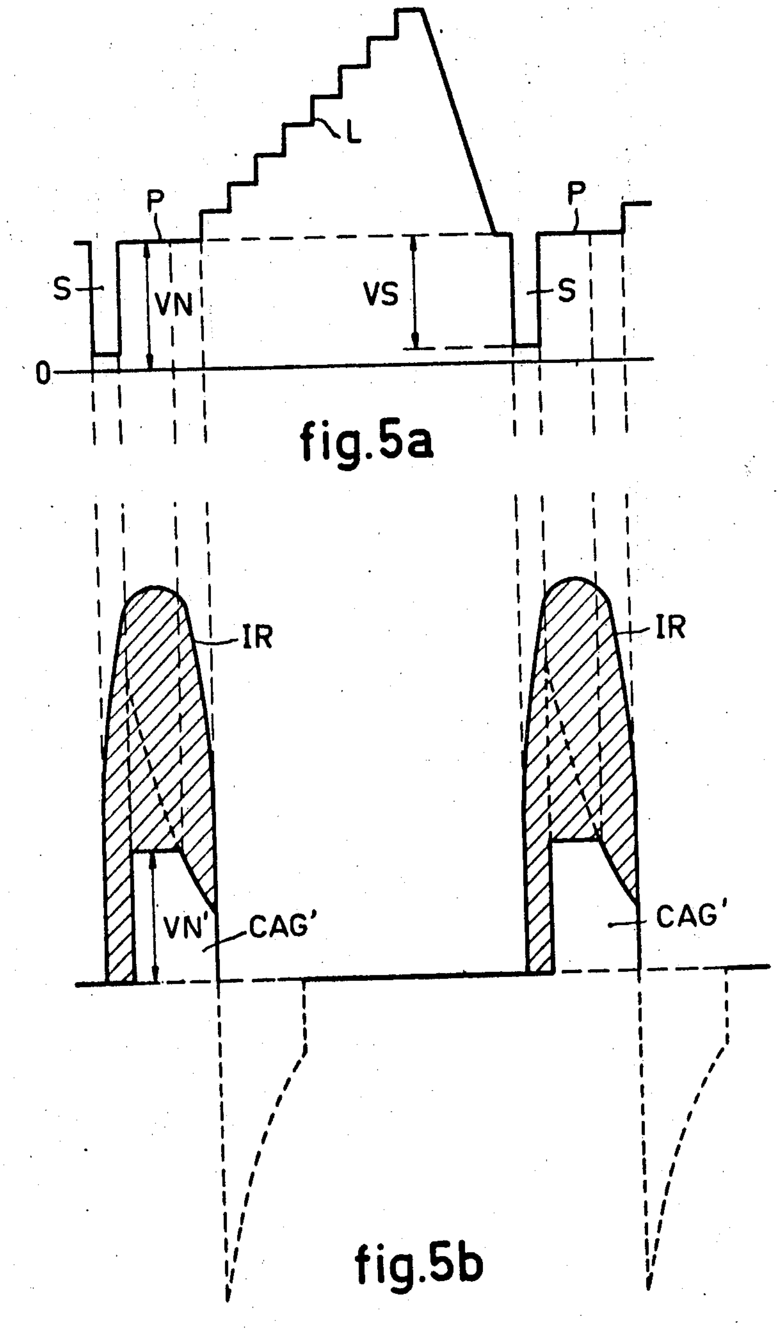

FIG. 5*a* corresponds to FIG. 2*a*. FIG. 5*b* shows the line flyback pulses which serve to generate the automatic gain control as it appears in the circuit arrangement shown in FIG. 4. Furthermore, FIG. 5*b* shows the result of the differentiation of the line flyback pulses on the shape of the gating pulses CAG.

Figures 6A, 6B:
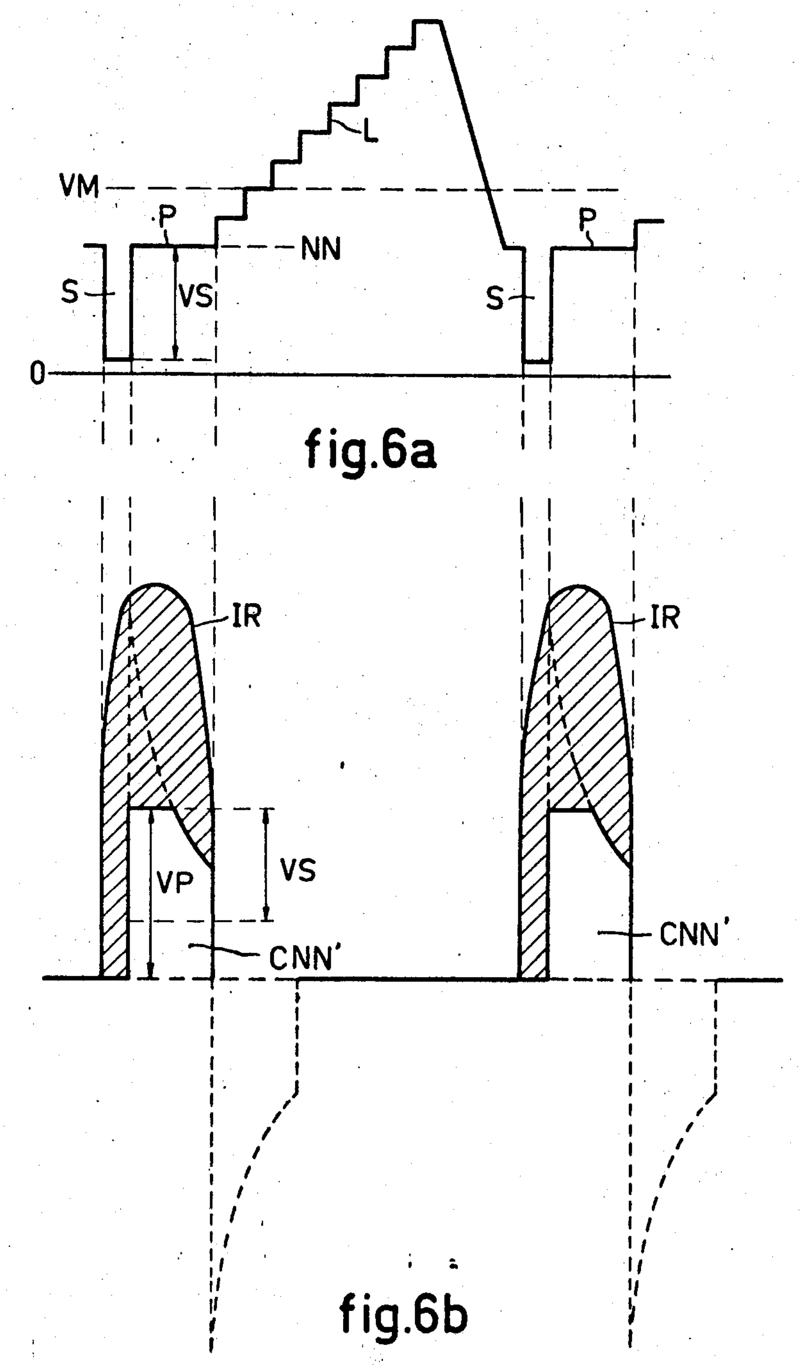

FIG. 6*a* corresponds to FIG. 3*a*. FIG. 6*b* shows the result of the differentiation of the line flyback pulses on the shape of the pulse CNN' which serves to clamp the black level.

FIG. 4 also shows how the diodes 17 and 18 of FIG. 1 can be replaced by a transistor 40 of the NPN-type. The emitter potential of the latter determines the black level. The transistor 40 is in fact saturated during the duration of the flyback pulse. Like the gating pulse for the automatic gain control voltage, this latter pulse is differentiated (FIG. 6*b*) by the capacitor 41 and the resistor 39. As a result of this a clamping at the beginning of the brightness signal is avoided when the line flyback pulse is shifted to the right.

Of course, many variations are possible without departing from the scope of this invention.

I claim:

1. An automatic gain control circuit for a television receiver that receives television signals, comprising means for receiving video signals from said television signals; a gate circuit having a first input coupled to said receiving means, a second blocking input and an output; means for generating an automatic gain control signal coupled to the output of said gate circuit; a source of line flyback signals; means for blocking said gate comprising a transistor having at least base and collector electrodes, said collector being coupled to said flyback signal source and being coupled to said blocking input and means for preventing the operation of said generating means during the occurrence of synchronization pulses comprising means for deriving a synchronization signal from said television signal coupled to said base of said transitor.

2. A circuit as claimed in claim 1 further comprising a differentiating network coupled between said blocking input and said transistor.

3. A circuit as claimed in claim 1 wherein said gate circuit further comprises a diode having a cathode coupled to said first gate input and an anode coupled to said second blocking input.

4. A circuit as claimed in claim 1 further comprising a clamping circuit coupled to said blocking means, and means for adjusting the clamping level of said clamping means.

5. A circuit as claimed in claim 4 further comprising a differentiating network coupled between said clamping circuit and said blocking means.

6. A circuit as claimed in claim 4 wherein said adjusting means comprises a potentiometer.

7. A circuit as claimed in claim 6 wherein said clamping circuit comprises a series circuit including a capacitor and oppositely poled diodes, the junction of one of said diodes and said capacitor being coupled to said potentiometer, the junction of said diodes being coupled to said blocking means.

8. A circuit as claimed in claim 6 wherein said clamping means comprises a second transistor having emitter, base, and collector electrodes, and a capacitor coupled in series with said emitter-collector path of said second transistor, one of said electrodes being coupled to said potentiometer, the base being coupled to said blocking means.